J. T. WILSON.
PISTON VALVE AND PACKING FOR THE SAME.
APPLICATION FILED MAR. 2, 1914.
1,143,009.
Patented June 15, 1915.
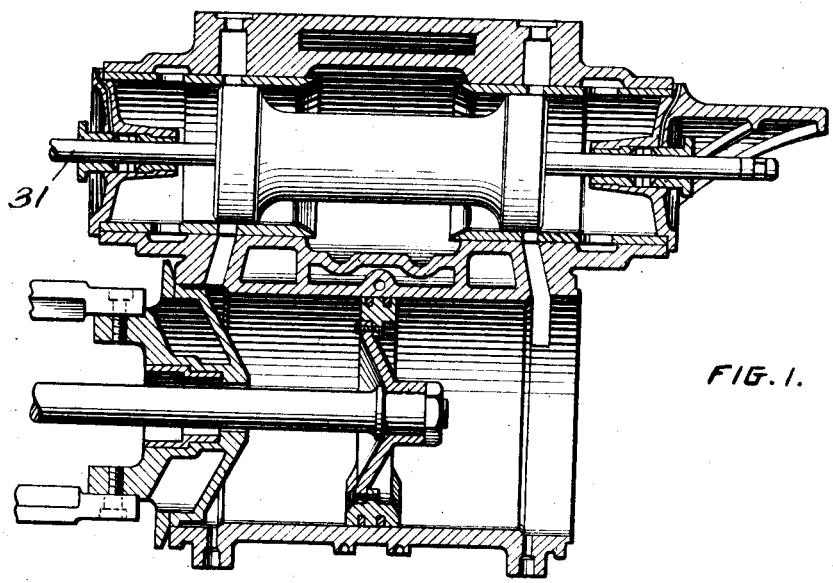
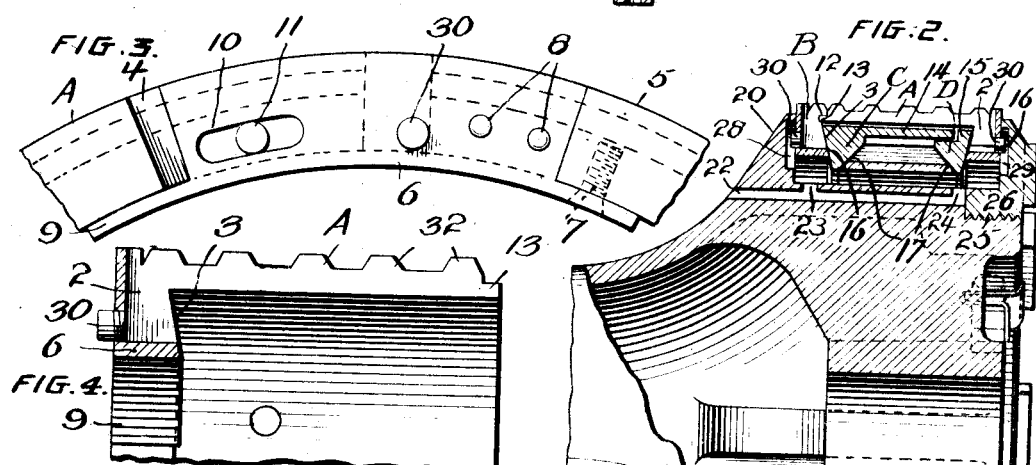

UNITED STATES PATENT OFFICE.

JOHN T. WILSON, OF JERSEY SHORE, PENNSYLVANIA.

PISTON-VALVE AND PACKING FOR THE SAME.

1,143,009.   Specification of Letters Patent.   Patented June 15, 1915.

Application filed March 2, 1914. Serial No. 822,010.

*To all whom it may concern:*

Be it known that I, JOHN T. WILSON, a citizen of the United States, residing at Jersey Shore, in the county of Lycoming and State of Pennsylvania, have invented certain new and useful Improvements in Piston-Valves and Packings for the Same, of which the following is a specification.

My invention relates to piston valves and in particular to the packings which are located at the ends of the valve and control the admission of steam and the discharge of steam from the cylinder at opposite sides of the engine piston; also to controlling the degree of pressure of a packing of a piston valve against the surface of the valve chamber.

The main object of the invention is the provision of a relatively wide packing having a relatively large bearing area in slight frictional contact with the cage, and the degree of pressure of the packing against the cage automatically controlled by the fluid pressure which operates the engine; said packing comprising as a part thereof a wide resilient expansible ring, preferably wider than the width of a port so it will be impossible for a ring to catch in the port.

Heretofore the practical use of relatively wide packings or packing rings has been attended with very great friction by reason of the excessive pressure beneath the packings or rings, resulting in the wearing away of the cage or the packings, or both, in a very short period of time, and in an excessive expenditure of energy to operate the valve; consequently wide packings or packing rings have been discarded and two separate relatively narrow rings substituted at each end of the piston valve which narrow rings frequently catch in the ports and cause great damage.

My improvement permits the use of relatively wide packings or rings without excessive friction and wear of the packings or cages, and which cannot catch in a port.

A further object is the provision of a packing having an expansible wide ring with an inwardly extended flange which flange in combination with other parts is used to lock the said ring so its exterior surface will not, when the packing is in use, excessively press against the cage.

A further object is the provision of a packing, comprising a relatively wide expansible ring, which not only shall have a limited degree of pressure against the cage when in use, but which also provides for the relief of excessive pressure due to the presence of water of condensation, or compressed air when the engine is drifting, and without injury of the packing.

A final object is the provision of a wide ring packing which can be locked against the cage with a limited pressure and which provides for the relief of excessive pressures upon the outside of the packing, as previously specified, and while possessing these characteristics shall be comprised of relatively few parts.

With the above main ends in view, the invention consists in certain novelties of construction and combination of parts are herein set forth and claimed; also in the method of controlling the degree of pressure of a packing against the surface of a valve chamber as herein set forth.

The accompanying drawing illustrates an example of the embodiment of the invention, the parts being constructed and combined according to the best so far tested and demonstrated mode of procedure I have devised for the purpose.

Figure 1 is a section in elevation of an engine cylinder and valve chamber showing the parts, including a piston and piston valve, in their relative locations, the packings of the piston valve being shown each wider than the width of a port. Fig. 2 is a broken section through the right end of the piston valve; the section at the top being through the lap joint of the expansible wide spring or resilient ring, expansible narrow spring or resilient ring, expansible wedge ring, and two integral wall rings; and that at the bottom being through all the rings. Fig. 3 shows in elevation a side view of part of the wide ring and the lap joint for the adjacent loose ends of the ring. Fig. 4 is a view in elevation of one end of a wide ring. Fig. 5 shows the adjacent ends of the wedge ring and lap joint. Fig. 6 is a section of Fig. 5 on line *x—x*.

The packings, one at each end of the piston valve, are identical and one only will be specifically described. Each packing comprises, in this example shown, five rings, though in some embodiments two of the rings may be omitted and the wide ring, wedge ring and one wall ring perform the requisite functions: First, a relatively wide cut resilient expansible packing ring A having a flange 2 at one edge with an inwardly extended beveled surface 3, the free ends 4 and 5 being united by a suitable lap joint plate 6, as shown, to prevent the passage of steam over the top of the ring at the edge. The ends 4 and 5 of the ring at the edge are cut away to receive flush the joint plate 6 which is secured at one end only to the wide ring by studs 7 and 8. The end 9 extends beneath the flange 2 and the vertical portion of the plate is provided with an elongated slot 10 within which is located a stud 11 fixed to the end 4 which stud obviously determines the maximum expansion of the wide ring. Secondly, a cut resilient expansible narrow packing ring B, having a groove 12 extending entirely around the same within which is loosely seated the edge or tenon 13 of the wide ring. The parted ends of this ring are united by a joint plate identical with that shown by Fig. 3, and it also has the like beveled surface 3, so it need not be further described. The third and fourth rings C and D, called wall rings, are each integral so they cannot expand or contract, but move sidewise only. The wall ring C has a wide flange 14, the edge of which loosely overlaps the ring D and can bear against the flange 15 on said ring to limit the movements of said rings toward each other. Both rings have similar beveled surfaces 16 and 17, the surfaces 16, 16 engaging beveled surfaces 3, 3 on the flange of the wide packing ring and the side of the narrow packing ring. The fifth ring E is a resilient expansible wedge ring having the beveled edges 18 which engage the beveled surfaces 17, 17 of the wall rings, and a lap joint plate 19 shown by Figs. 5 and 6.

The piston valve body and spools may be made of any desirable construction and be provided with a circular recess at opposite ends or have a plurality of such recesses when more than two packings are used. There is shown in this instance a desirable form of construction—a valve body having at each end a projecting circular flange 20 with a vertical bearing surface 21 and a series of holes 22 for the admission of live steam beneath the rings by way of the series of openings 23 and 24. The extreme outer ends of the valve body are threaded at 25, to receive adjustable threaded rings 26, each having a vertical bearing surface 27 to engage the packing—in this case the flange 2 of the wide ring.

Recesses 28, 29 are formed in flange 20 and ring 26, as shown, to loosely receive the studs 30, 30 set in the narrow packing ring and flange of the wide ring to prevent the movement of said rings relative to the longitudinal axis of the valve body.

The wide packing ring is shown with holes through the same, and with its outer surface provided with ribs 32, but the outer surface may be plain.

In practice the wide flanged spring ring and the narrow spring ring are turned larger than the diameter of the cage, and then put in the cage under compression so the tension of the rings will cause them to expand against the inner surface of the cage.

When steam is admitted to the central chamber it passes through the series of holes 22 to the under surfaces of both packings. In order to insure the expansion of the narrow and wide packing rings of each packing prior to and in advance of any considerable expansion of the wedge ring, the steam is delivered in jets through holes 23 and 24 directly against the under surfaces of said two rings which are thus expanded quickly against the cage while the wedge ring has only initially expanded or partly expanded. A further expansion of the wedge ring under increased pressure of the steam moves the wall rings apart and locks the narrow and wide packing rings so they cannot expand further against the cage. In their locked position the said packing rings bear against the cage sufficiently to prevent the passage of steam over them, but with very little pressure, consequently in moving relative to the cage there is but slight frictional resistance between the packing rings and cage and very little wear of the surfaces in the reciprocating movements of the packing when the valve is in action. As the packing is locked in a substantially fixed position and the wide ring is wider than a port the edge thereof cannot catch in a port. Furthermore, it is obvious that under ordinary conditions when the packing is over a port containing steam under pressure acting upon the exterior surface of the packing said pressure will not be sufficient to overcome the pressure beneath the packing and unlock the said packing. That is, the exterior pressure will not be sufficient to contract the packing rings under ordinary conditions. However, should the outer pressure upon the outer surfaces of a packing overbalance the pressure beneath the same and the frictional resistance of the beveled surfaces of the rings, due to the presence of water of condensation in the cylinder, or other causes, the packing or part thereof may contract and the excessive pressure thus be relieved, whereupon the packing is again locked in its proper position by the expansion of the wedge ring. When the engine is drifting and air in the cylinder is compressed the pressure is relieved in a similar manner and without injuring the packing.

As shown by the drawing, the two wall rings, inasmuch as the edge of flange 14 bears against flange 15 and limits the movement of said wall rings toward each other, lock the narrow and wide rings within the recess in the spool through the engaging beveled surfaces of the rings so the packing cannot become displaced.

From the description taken in connection with the drawing it is clear that I have produced an improved piston valve and a packing comprising a relatively wide flanged expansible ring which will have its frictional contact with a cage when in use automatically regulated, which provides for the relief of excessive pressure upon its exterior surface or excessive port pressure, which cannot catch in a port, which will not excessively wear the cage or itself be excessively worn away, due to the slight frictional contact with the cage, which can easily be operated, and which possesses other important characteristics of construction and combination and mode of operation as well as advantages in use which will be recognized by those skilled in the art.

What I claim is:

1. The combination with a valve body having a groove, of a packing comprising a wide expansible packing ring with a flange, and a plurality of circular wedge rings one of which is expansible, an opening being provided for admitting motive fluid beneath the packing to expand the ring with a flange against the valve chamber surface and then operating the wedges to lock said ring in its expanded position.

2. The combination with a piston valve having a packing ring which is wider than the chamber port to the cylinder and provided with an inwardly extending flange, of a system of circular wedges and means to admit motive fluid beneath said ring and wedges, whereby the degree of frictional contact of the packing ring against the chamber is automatically controlled by the pressure of the motive fluid.

3. The combination with a valve chamber having a port opening to a cylinder, of a piston valve provided with a packing, said packing having a ring wider than the port and said ring also being provided with a rigid flange, and circular wedges combined with said ring; means being provided for admitting operating fluid under pressure beneath said packing; whereby the frictional contact of the packing with the surface of the valve chamber is automatically controlled.

4. A piston valve having a packing provided with a wide packing ring with a flange, and means for automatically controlling the frictional contact of the packing with the valve chamber surface.

5. The combination of an expansible wide packing ring with a flange, a non-expansible wall ring, and an expansible wedge ring.

6. The combination of an expansible wide packing ring with a flange, an expansible packing ring interlocking with the said wide ring, and means engaging the said two rings to lock said rings when expanded.

7. A separated resilient expansible wide packing ring having an inwardly projecting flange with a beveled surface.

8. The combination of a separated expansible wide packing ring having a flange, and a plurality of rings with beveled surfaces for locking the packing ring in an expanded position.

9. A separated expansible wide ring for a valve packing, said ring having an inwardly extended flange at the edge with a beveled surface, and a joint plate in connection with the flange, said plate being rigidly secured to one end of the said ring and loosely overlapping the other end of the ring.

10. A separated expansible wide ring for a valve packing, said ring having an inwardly extended flange with a beveled surface, and a joint plate in connection with the flange.

11. A separated expansible wide packing ring for a valve packing, said ring having an inwardly extending flange at one edge, and a joint plate in connection with the flange, said plate being rigidly secured to one end of the said ring and loosely overlapping the other end of the ring, the plate and one end of the ring being provided with means for preventing the expansion of the wide ring beyond a predetermined degree.

12. The combination in a valve packing, of an expansible wide packing ring, having an inwardly projecting flange with a beveled surface an expansible narrow packing ring interlocking therewith at one edge of said wide packing ring, and means for expanding and locking said rings.

13. The combination in a valve packing, of an expansible wide packing ring having a flange, a narrow expansible packing ring interlocking with said wide ring, and means for expanding and locking said rings against the cage.

14. The combination in a valve packing, of an expansible wide packing ring having an inwardly extended flange at one edge, an expansible packing ring at the other edge, an integral wall ring, and a wedge ring.

15. The combination in a valve having a recess for a packing and holes for the passage of steam to said recess, of a packing comprising an expansible wide ring with a flange, an expansible narrow ring interlocking with said wide ring, and means for locking the said rings when said rings have been expanded against the cage by steam pressure admitted beneath the rings.

In testimony whereof I affix my signature in presence of two witnesses.

JOHN T. WILSON.

Witnesses:
MILDRED B. WILSON,
THOMAS TIPPETT.